United States Patent [19]

Puvogel et al.

[11] 4,446,780
[45] May 8, 1984

[54] FOOD HOLDING CABINET WITH STABILIZED AIR FLOW

[75] Inventors: Timothy J. Puvogel, West Alexandria; James D. King, Oakwood; David O. Moore, Eaton, all of Ohio

[73] Assignee: Henny Penny Corporation, Eaton, Ohio

[21] Appl. No.: 412,027

[22] Filed: Aug. 26, 1982

[51] Int. Cl.³ .............................................. F26B 9/06
[52] U.S. Cl. ...................................... 99/480; 99/483
[58] Field of Search ............ 126/21 A, 21 R; 34/196, 34/212, 218, 219; 432/199; 62/159, 255, 256; 99/473–476, 480, 483; 312/297, 236

[56] References Cited

U.S. PATENT DOCUMENTS

| 354,748 | 12/1886 | Sloan | 126/21 R |
| 1,929,881 | 10/1933 | Darrah | 432/199 X |
| 3,958,552 | 5/1976 | Lawler | 126/21 A X |
| 4,237,623 | 12/1980 | Timm et al. | 261/119 R X |

FOREIGN PATENT DOCUMENTS 1035072  7/1958  Fed. Rep. of Germany ...... 432/199

*Primary Examiner*—Francis K. Zugel
*Assistant Examiner*—Joseph Falk
*Attorney, Agent, or Firm*—Frost & Jacobs

[57] ABSTRACT

A food holding cabinet having a heating and air circulating system overlying the interior of the cabinet, the system including a blower having its inlet side connected to an air mixing chamber and its outlet side connected to an air heating chamber. The air mixing chamber has a first air inlet orifice at the front-top-center of the interior of the cabinet for recirculating air from within the cabinet and a second air inlet orifice in communication with the outside of the cabinet to introduce fresh air, the recirculated air and fresh air being admixed in the air mixing chamber and discharged into the heating chamber. From the heating chamber the air flows downwardly through a duct at the rear of the cabinet, the duct having rows of perforations aligned with the undersurfaces of product containing trays or baskets in the cabinet, the air being drawn through the cabinet for return to the mixing chamber. Air vents are provided in the lower front wall of the cabinet to enhance the circulation of air throughout the lower frontal portion of the cabinet to stabilize the temperature of the air circulating through the interior of the cabinet and prevent the formation of cold spots. Mechanisms may be provided to vary the proportion of fresh air to recirculating air, and the vent ports in the front wall of the cabinet may be provided with mechanisms to control the quantity of air flowing through the vent ports.

9 Claims, 5 Drawing Figures

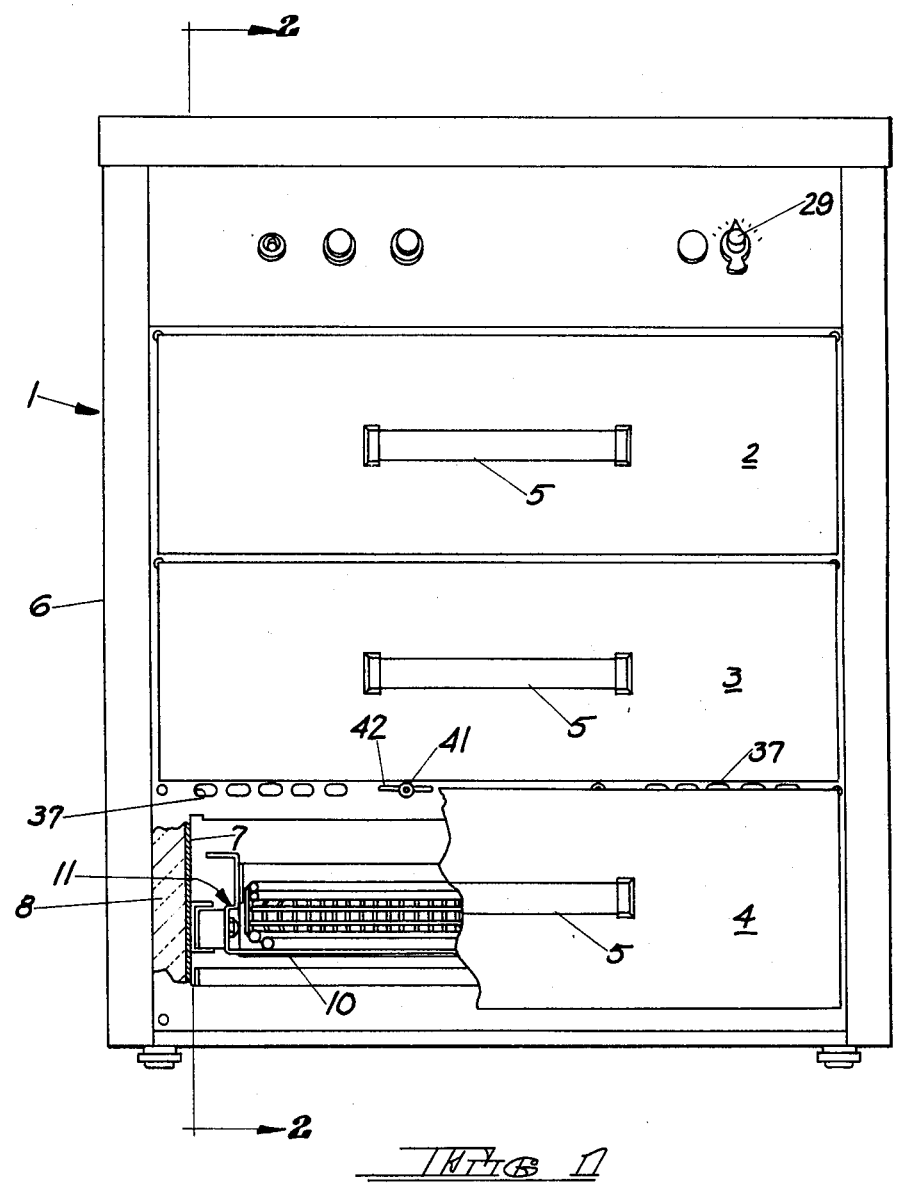

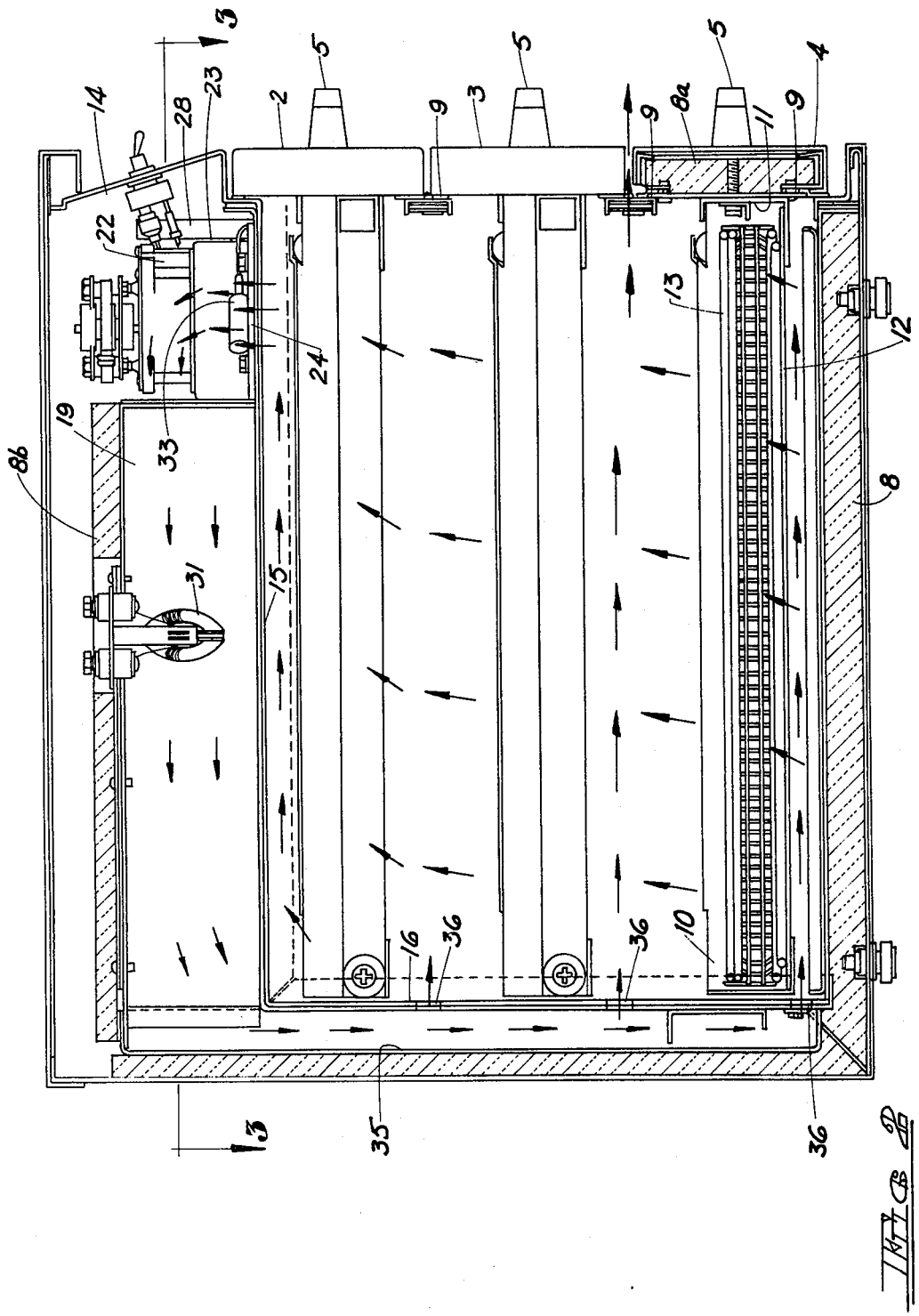

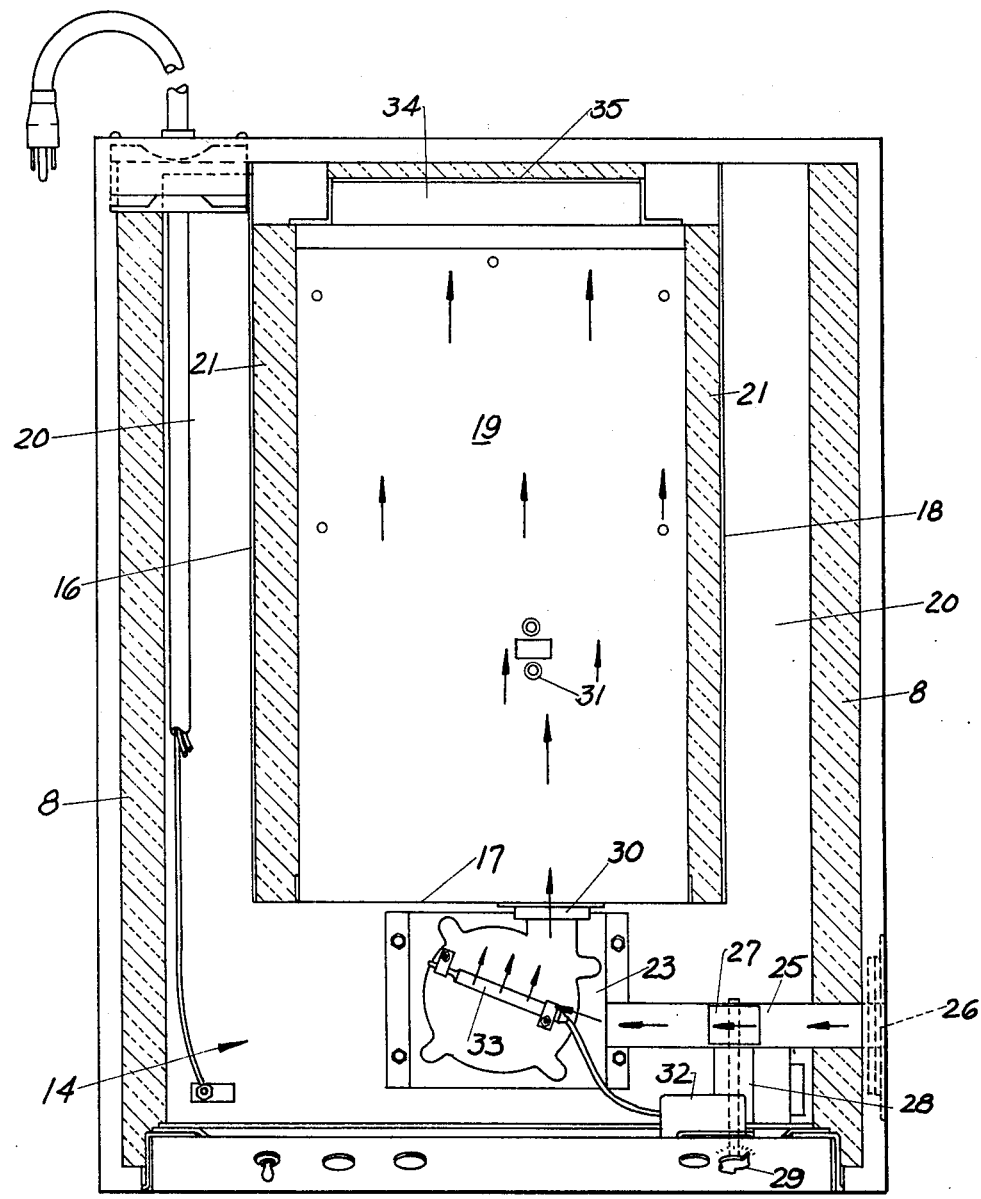
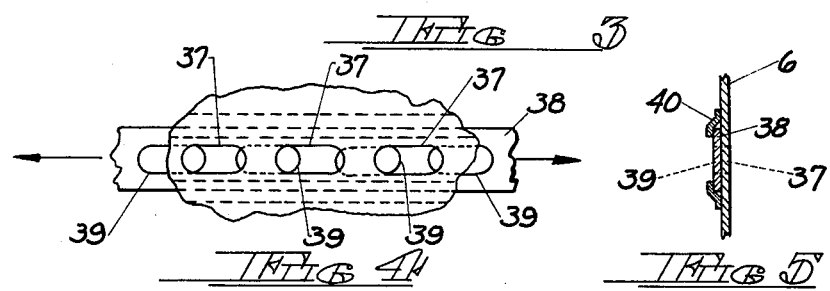

FOOD HOLDING CABINET WITH STABILIZED AIR FLOW

This invention relates to holding cabinets for prepared foods, and more specifically to a holding cabinet particularly suited for foods which do not require humidification during the holding period.

BACKGROUND OF THE INVENTION

In the fast-food industry, it is necessary to have a supply of cooked products available at all times to meet the needs of the customers. The food products are normally prepared in large quantities and placed in holding cabinets to maintain them in a heated condition until they are needed.

There are basically two types of holding cabinets, namely, those which control only the temperature of the products, and those which control both temperature and moisture content. If the products being held are of the type which have a tendency to lose moisture and dry out, it is necessary to control the moisture content of the heated air being circulated within the cabinet. There are, however, a number of food products which do not require an environment in which moisture is added to the air being circulated. In fact, excessive moisture may be deleterious to the quality of the product. For example, products which are cooked in a batter, or bakery products, such as rolls and buns, will become soggy if exposed to excessive moisture. Consequently, there are numerous applications wherein it is unnecessary to add moisture to the circulating air, and under such conditions there is no need to employ holding cabinets equipped with expensive moisture control units.

A principal difficulty with presently known holding cabinets, irrespective of their type, is their inability to maintain a stabilized uniform temperature within the cabinet. The problem of temperature stabilization is magnified by the fact that the cabinet must be repeatedly opened and closed to permit the products to be removed. Another disadvantage is the fact that most holding cabinets are closed systems in that they simply circulate the air contained within the cabinet, the cabinet being exposed to outside fresh air only when the cabinet is opened. This leads to over-drying of the air within the cabinet which can be a problem even in instances where humidity control is not normally required. In addition, it is often difficult to maintain a stabilized temperature within the cabinet even if the temperature is thermostatically controlled due to the fact that the heating elements will continue to heat the air for a substantial length of time after they have been turned off, with the result that the temperature will fluctuate over relatively wide limits. Difficulties are also experienced in achieving uniform air distribution throughout the holding cabinet, particularly in areas which are remote from the air return.

The present invention overcomes the difficulties encountered with known holding cabinets by providing a cabinet construction which is particularly suited for products which do not require an humidified environment. The basic construction of the holding cabinet of the present invention is similar to that disclosed in U.S. Pat. No. 4,237,623, issued Dec. 9, 1980, directed to a humidified holding cabinet. However, a number of significant modifications and changes have been made in order to provide a cabinet which does not require a humidifying system and yet will maintain a stabilized temperature throughout.

SUMMARY OF THE INVENTION

In accordance with the present invention, the holding cabinet is preferably of the countertop type, having a series of drawers, usually three in number, arranged one above the other. The drawers are in the form of louvered pans or wire mesh baskets adapted to be filled with the product, the drawers having solid front panels which, when closed, enter the sealing engagement with the cabinet.

The heating and air circulating system is at the top of the cabinet, the system including a blower located at the front-top-center of the cabinet. The blower has a pair of air inlets and a single air outlet. The first air inlet is in communication with the interior of the cabinet and the second is in communication with the outside air, thereby permitting fresh air to be admixed with the air circulating within the cabinet. The blower outlet communicates with one end of a heating chamber containing a heating element, the heated air being directed through the heating chamber to the rear of the cabinet where it passes downwardly through a full width duct defining the inner rear wall of the cabinet. With this arrangement, the fresh air drawn into the system through the fresh air inlet is initially admixed with the heated air being recirculated in the cabinet and the admixed air heated as it passes through the heating chamber.

The duct defining the inner rear wall of the cabinet is provided with sets of perforations to permit the heated air to flow into the interior of the cabinet from the rear wall, the air flowing forwardly toward the front of the cabinet. Preferably, the perforations will be arranged to direct streams of air into the cabinet immediately beneath each product-containing drawer. This assures that heated air will flow through the drawers as the air is drawn through the cabinet toward the blower inlet orifice lying at the front of the top wall of the cabinet.

It has been found, however, that cold spots tend to develop toward the lower front of the cabinet, and that such non-uniformly heated areas can be eliminated by providing vents at the front of the cabinet preferably between the bottom and middle drawers. Since the blower acts to pressurize the air circulating within the cabinet, the vents effectively serve to permit some of the heated air to escape, but in so doing the air is drawn into the areas where the cold spots would otherwise develop. Preferably, the vents will lie to the outside of the drawer handles so that the heated air does not unduly heat the handles.

The inside and outside air inlets to the blower will be sized to permit the introduction of the desired quantity of fresh air into the system. A ratio of about 30% fresh air to 70% recirculated air has been found to produce optimum operating conditions. If conditions are encountered which require a variation in the ratio of inside to outside air, it is preferred to provide a damper in association with the fresh air inlet to regulate the volume of fresh air being introduced into the system.

The exhaust vents in the lower front of the cabinet should be near the bottom, but they should not be at the bottom, i.e., beneath the lowermost drawer, since it has been found that if the vents are at the bottom of the front wall, the heated air flowing through the vents will tend to condense on a relative cooler adjacent surface, such as the countertop on which the cabinet is supported. By positioning the vents between the bottom and middle drawers, the moisture in the air flowing through the vents will be dissipated in the atmosphere before reaching a relatively cool surface.

It has been found that where a minor proportion of fresh air is introduced into the system, there will be sufficient moisture maintained in the cabinet to prevent the drying out of the product being held. In fact, the variable fresh air introduction may be used to remove moisture from the cabinet (and the product) until the desired equilibrium conditions are obtained.

It will be understood that a holding cabinet in accordance with the invention will be provided with a temperature controller, preferably located in the air return to the blower which will act to energize and deenergize the heating element in the heating chamber. The cabinet also may be provided with conventional controls, such as a thermometer, to give a visual indication of the cabinet temperature; and the cabinet also may be provided with a separate ventilating system for the blower and the controls to assure that they will not be overheated.

DESCRIPTION OF THE DRAWINGS

FIG. 1 is a front elevational view of an exemplary three drawer holding cabinet in accordance with the invention.

FIG. 2 is a vertical sectional view taken along the line 2—2 of FIG. 1.

FIG. 3 is a horizontal sectional view taken along the line 3—3 of FIG. 2.

FIG. 4 is an enlarged fragmentary elevational view of a damper for the vents in the front wall.

FIG. 5 is a vertical sectional view taken along the line 5—5 of FIG. 4.

DESCRIPTION OF THE PREFERRED EMBODIMENTS

As seen in FIG. 1, wherein the holding cabinet is indicated generally by the reference numeral 1, the cabinet has a series of drawers 2, 3, and 4 arranged one above the other, each drawer having a handle 5 by means of which the drawers may be opened and closed. In the embodiment illustrated, the cabinet has an outer shell 6 and an inner shell 7 lying in spaced relation to each other, with insulation 8 interposed between the inner and outer shells. It is also preferred to insulate the front panels of the drawers, as indicated at 8a, with additional insulation 8b overlying the top wall of the heating chamber 19, as seen in FIG. 2. The front panels of the drawers are adapted to seat against gaskets 9 when the drawers are closed, thereby preventing leakage of air from the interior of the cabinet around the drawer fronts.

Each of the drawers is supported by a generally rectangular supporting frame 10, the opposite sides of which are mounted on drawer suspension members 11, which may be of telescoping type to permit the drawers to be fully extended. As seen in FIG. 2, the supporting frames have horizontally disposed peripheral bottom flanges 12 which define seats on which a wire basket 13 may be seated, the basket serving as a receptacle for the product being stored. Alternatively the frames may be utilized to receive pans which are perforated or louvered to facilitate the circulation of air around the product. The user thus has a choice of product receptacles depending upon the nature of the product being stored. When the drawers are open, the pans or baskets may be lifted from the supporting frames 10 for cleaning. The basic cabinet just described is essentially the same as that shown in the aforementioned U.S. Pat. No. 4,237,623, although it will be understood that the specific construction of the cabinet does not constitute a limitation on the invention, the essential consideration being the provision of an insulated cabinet having a series of product receiving drawers which, when closed, make sealing contact with the cabinet.

The heating and air circulating system is located in a separate compartment 14 at the top of the cabinet separated from the interior of the cabinet by a dividing wall 15 the rear side edge of which coincides with the upper edge of the inner rear wall 16 of the inner shell 7.

As seen in FIG. 3, compartment 14 is divided by walls 16, 17 and 18 to define a heating chamber 19, the area lying outside the walls defining a U-shaped outer chamber 20. Preferably, the walls 16 and 18 will be covered with insulation 21.

A blower unit 22 is mounted in outer chamber 20 at the front center of the cabinet, the blower unit having an air mixing chamber 23. A first air inlet orifice 24 is formed in dividing wall 15 adjacent its front edge and intermediate its opposite side edges. As seen in FIG. 3, the mixing chamber 23 is also in communication with a fresh air duct 25 having a fresh air inlet orifice 26 at the side of the cabinet. The inlet side of the blower is in communication with the air mixing chamber 23 and hence acts to draw air into the mixing chamber 23 both through first inlet orifice 24 in communication with the interior of the cabinet and second air inlet orifice 26 in communication with the outside air.

The relative quantities of air drawn into the mixing chamber 23 may be regulated by varying the sizes of the orifices 24 and 26 to provide the desired ratio between outside air and air from the interior of the cabinet, although it is preferred to provide a damper 27 in fresh air duct 25 to regulate the intake of fresh air and, hence, the ratio of fresh air to recirculated air. The damper is provided with an adjustment mechanism 28 which may be operated by an adjustment knob 29 mounted on the front of the cabinet. Alternatively, the mechanism may be adjusted from within the cabinet by means of a tool to prevent accidental or unauthorized changes in the adjustment. The outlet side of the blower is in communication with an outlet orifice 30 in wall 17. With this arrangement, air drawn into mixing chamber 23 from the interior of the cabinet will be admixed with fresh air drawn into the chamber through duct 25 and the admixed air expelled through outlet orifice 30.

The outlet orifice 30 communicates with the heating chamber 19 which contains a conventional resistance heating element 31 operatively connected to a thermostatic controller 32 located in the outer chamber 20. The thermostatic controller is connected to a temperature probe 33 and will be set to the desired cabinet temperature, the controller being arranged to energize and deenergize heating element 31 in accordance with the air temperature as sensed by the probe 33. Preferably the controller will be preset to the desired temperature at which a particular product is to be held, although the controller may be provided with a manual adjustment knob to permit adjustment of the temperature as desired. In either event, the cabinet may be provided with a conventional gauge type thermomemter on the front of the cabinet to indicate cabinet temperature.

Upon passage of the heated air through the heating chamber 19, the heated air flows downwardly into a duct 34 defined between inner rear wall 16 and vertical panel 35, the air being introduced into the interior of the cabinet through spaced apart rows of perforations 36 underlying the bottom rear edges of drawers 2, 3 and 4, respectively. The number of perforations in each row, as well as the number of rows themselves, may be varied as desired, the objective being to provide for essentially uniform circulation of air throughout the interior of the cabinet, the air flowing between and around the drawers as well as through the product containing baskets or louvered trays. As the air flows into the interior of the cabinet it will be drawn forwardly and then upwardly toward the inlet orifice 24 by the inlet side of the blower.

In order to avoid cold spots, particularly at the lower frontal extremity of the cabinet, sets of vents or outlet ports 37 are provided in the front of the cabinet intermediate drawers 3 and 4, the sets of vents lying on each side of the cabinet beyond the ends of the handles 5. Since the blower will produce a positive pressure in the otherwise sealed cabinet, heated air in the lower front portion of the cabinet will be drawn toward and escape through the vents 37, although the major portion of the air will be drawn upwardly for return to the blower unit through inlet orifice 24. The vents will be sized to control the amount of air which is permitted to escape, consistent with the objective of establishing and maintaining a uniform flow of air throughout the lower extremities of the cabinet to avoid the formation of cold spots. It is preferred to space the vents 37 upwardly from the bottom of the cabinet since it has been found that if the vents are immediately adjacent the bottom wall of the cabinet, the escaping air will tend to condense on an adjoining cooler surface, such as the countertop on which the cabinet is seated.

Preferably, the vents will be provided with adjustable dampers, such as the slide bar 38 as seen in FIG. 4, the slide bar having perforations 39 therein adapted to open and close the vents 37 depending upon the axial displacement of the slide bar 38. The slide bars may be mounted in suitable channels 40 to facilitate sliding movement, and as seen in FIG. 1, and they will be provided with set screw means 41, movable in slot 42 to vary the size of the vents.

As should now be evident, the present invention provides a holding cabinet for use with products which do not require substantial humidification while they are being stored. The heating and air circulating system is specifically designed to permit the controlled admixing of fresh outside air with the air being circulated in the cabinet, such mixture serving to maintain a stabilized humidity level within the cabinet without adding sufficient moisture to adversely affect the products being stored. The system also serves to stabilize the air flow within the cabinet itself, with particular reference to the avoidance of cold spots, particularly in the lower frontal areas of the cabinet.

Modifications may be made in the invention without departing from its spirit and purpose. For example, in order to prevent the build up of excessive heat in the outer chamber 20 where the blower unit and controls are located, a separate fresh air fan may be provided at the rear of one of the legs of the U-shaped outer chamber, the fans serving to circulate fresh air through the outer chamber, the air being discharged through outlet the orifice at the rear end of the opposite leg of the chamber.

What is claimed is:

1. A heating and air circulating system for a holding cabinet having a normally closed product receiving compartment containing a plurality of product receiving receptacles lying one above the other, said system having a blower unit overlying said product compartment, said blower unit comprising a blower having an inlet side and a discharge side, and an air mixing chamber in communication with the inlet side of said blower, a first inlet orifice in the top-front-center of said product compartment in communication with said air mixing chamber for recirculating air flowing through said product compartment, a second air inlet orifice in communication with said air mixing chamber and with the outside air for introducing outside air into said mixing chamber, said first and second orifices being sized relative to each other to permit the introduction of predetermined amounts of recirculated air and outside air into said mixing chamber, a heating chamber in communication with the outlet side of said blower, heating means in said heating chamber, means for activating and deactivating said heating means, duct means in communication with said heating chamber, said duct means being positioned to convey heated air flowing through said heating chamber into said product compartment from the rear thereof, said duct means including air outlets positioned to direct heated air into said product compartment beneath each of said product receiving receptacles, and air venting means in the lower front wall of said product compartment to enhance the circulation of air throughout the lower frontal portion of said product compartment, said air vent means being spaced upwardly from the bottom of the product receiving compartment, whereby to stabilize the temperature of the air circulating in said product compartment.

2. The heating and air circulating system claimed in claim 1 including damper means in association with said second air inlet orifice to effectively size said orifice to introduce the desired amount of outside air.

3. The heating and air circulating system claimed in claim 2 wherein said second air inlet orifice is located in a wall of said cabinet, wherein an air duct interconnects said mixing chamber and said second air inlet orifice, and wherein said damper means is mounted in said air duct.

4. The heating and air circulating system claimed in claim 3 including manually movable means mounted on said cabinet for adjusting the position of said damper means.

5. The heating and air circulating system claimed in claim 1 wherein the air venting means in the lower front wall of said product compartment comprises a series of outlet ports.

6. The heating and air circulating system claimed in claim 5 wherein said product receiving receptacles comprise a plurality of drawers projecting inwardly from the front wall of said cabinet, and wherein said vent ports lie between the lowermost and next adjacent drawers in said cabinet.

7. The heating and air circulating system claimed in claim 6 wherein said drawers have centrally disposed handles thereon, and wherein said vent ports are disposed outwardly with respect to the opposite sides of said handles.

8. The heating and air circulating system claimed in claim 1 including adjustable means in association with the air venting means to selectively vary the quantity of air flowing through said air venting means.

9. The heating and air circulating system claimed in claim 8 wherein said air venting means comprises a plurality of vent ports, and wherein said adjustable means comprises means for opening and closing said ports.

* * * * *